(12) United States Patent
Nilson et al.

(10) Patent No.: US 8,598,835 B2
(45) Date of Patent: Dec. 3, 2013

(54) PROTECTION CIRCUIT FOR A DRIVE CIRCUIT OF A PERMANENT MAGNET MOTOR AND CORRESPONDING SYSTEM

(75) Inventors: Thord Agne Gustap Nilson, Tyreso (SE); Miroslaw Hrywniak, Tyreso (SE)

(73) Assignee: Kollmorgen AB, Stockholm (SE)

( * ) Notice: Subject to any disclaimer, the term of this patent is extended or adjusted under 35 U.S.C. 154(b) by 155 days.

(21) Appl. No.: 13/020,481

(22) Filed: Feb. 3, 2011

(65) Prior Publication Data

US 2011/0188158 A1 Aug. 4, 2011

(30) Foreign Application Priority Data

Feb. 4, 2010 (EP) .................................... 10152613

(51) Int. Cl.
*H02P 1/46* (2006.01)
*H02P 1/50* (2006.01)
*H02P 3/18* (2006.01)
*H02P 6/00* (2006.01)

(52) U.S. Cl.
USPC ............. 318/717; 340/662; 361/90; 361/91.1

(58) Field of Classification Search
USPC ..................... 318/717; 340/662; 361/90, 91.1
See application file for complete search history.

(56) References Cited

U.S. PATENT DOCUMENTS

| 4,873,453 | A | * | 10/1989 | Schmerda et al. | ............ 307/130 |
|---|---|---|---|---|---|
| 5,513,058 | A | * | 4/1996 | Hollenbeck | ....................... 361/36 |
| 6,008,599 | A | * | 12/1999 | Beck | ......................... 318/400.29 |
| 6,020,702 | A | * | 2/2000 | Farr | ............................. 318/434 |
| 2007/0182459 | A1 | * | 8/2007 | Rees et al. | ....................... 327/78 |
| 2008/0174184 | A1 | * | 7/2008 | Arpilliere et al. | ............. 307/125 |

* cited by examiner

*Primary Examiner* — Erick Glass
(74) *Attorney, Agent, or Firm* — Bryan G. Pratt; Holland & Hart LLP

(57) ABSTRACT

It is presented a protection circuit for a drive circuit of a permanent magnet motor being powered by a main DC source. The protection circuit comprises a protection circuit DC source; a changeover switch being arranged to select an input to a gate of a main drive switch of the drive circuit, the input being selectable between an output of the protection circuit DC source and a second control signal; and a changeover control device connected to control the changeover switch, which changeover control device is arranged to ensure that the changeover switch is connected to the output of the second side of the protection circuit DC source when an overvoltage is detected.

10 Claims, 2 Drawing Sheets

PROTECTION CIRCUIT FOR A DRIVE CIRCUIT OF A PERMANENT MAGNET MOTOR AND CORRESPONDING SYSTEM

FIELD OF INVENTION

The present invention relates generally to control of permanent magnet electrical motors, and more particularly to control of permanent magnet electrical motors during fault conditions.

BACKGROUND

Faults during operation of permanent magnet electrical motors are fortunately very rare. However, in the situation that a fault does occur, since there is a permanent magnet rotor, the motor can in this case operate as a generator. Consequently, if rotor speed is sufficiently high a generated overvoltage will result causing electrical stress on components of any drive system connected to the motor. This can result in costly repairs and significant system down times.

One way to reduce any ill-effects of faults, is to over dimension any components that would be subjected to high voltage during faults. However, such over dimensioning is expensive and may also require more space to house physically larger components.

JP-2000 184 770 presents a solution where breakers are used to cut off an electrical connection between inverter and a permanent magnet AC motor. However, breakers are relatively slow and a faster solution would reduce any ill-effects during a fault.

SUMMARY

An object of the present invention is thus to improve fault handling for drives using permanent magnet motors.

According to a first aspect of the invention, it is presented a protection circuit for a drive circuit of a permanent magnet motor the protection circuit being powered by a main DC source. The protection circuit comprises: a protection circuit DC source; a changeover switch being arranged to select an input to a gate of a main drive switch of the drive circuit, the input being selectable between an output of the protection circuit DC source and a second control signal; and a changeover control device connected to control the changeover switch, which changeover control device is arranged to ensure that the changeover switch is connected to the output of the second side of the protection circuit DC source when an overvoltage is detected.

Using this arrangement, the main drive switch can be turned on quickly and efficiently when an overvoltage is detected.

The changeover control device may comprise a comparator. A comparator is a very fast way to control the switch, whereby the overvoltage is taken care of quickly.

The changeover control device may be arranged to compare a voltage selected between two poles of the main DC source with a reference voltage.

Each one of two inputs of the comparator may be connected to a respective voltage divider.

The protection circuit DC source may comprise a DC to DC converter with a first side and a second side, wherein the first side is arranged to be connected to a main DC source for the drive circuit.

The output of the DC to DC converter may have a voltage difference of less than one tenth of the voltage difference of the input of the DC to DC converter.

The comparator may comprise hysteresis.

The protection circuit DC source may comprise an energy storage.

A second aspect of the invention is a protection circuit system comprising a plurality of protection circuits according to the first aspect, wherein the number of protection circuits corresponds to the number of phases of the permanent magnet motor.

The protection circuit system may consist of three protection circuits.

It is to be noted that any feature of the first and second aspects may, where appropriate, be applied to any other aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF DRAWINGS

The invention is now described, by way of example, with reference to the accompanying drawings, in which.

DETAILED DESCRIPTION OF PREFERRED EMBODIMENTS

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
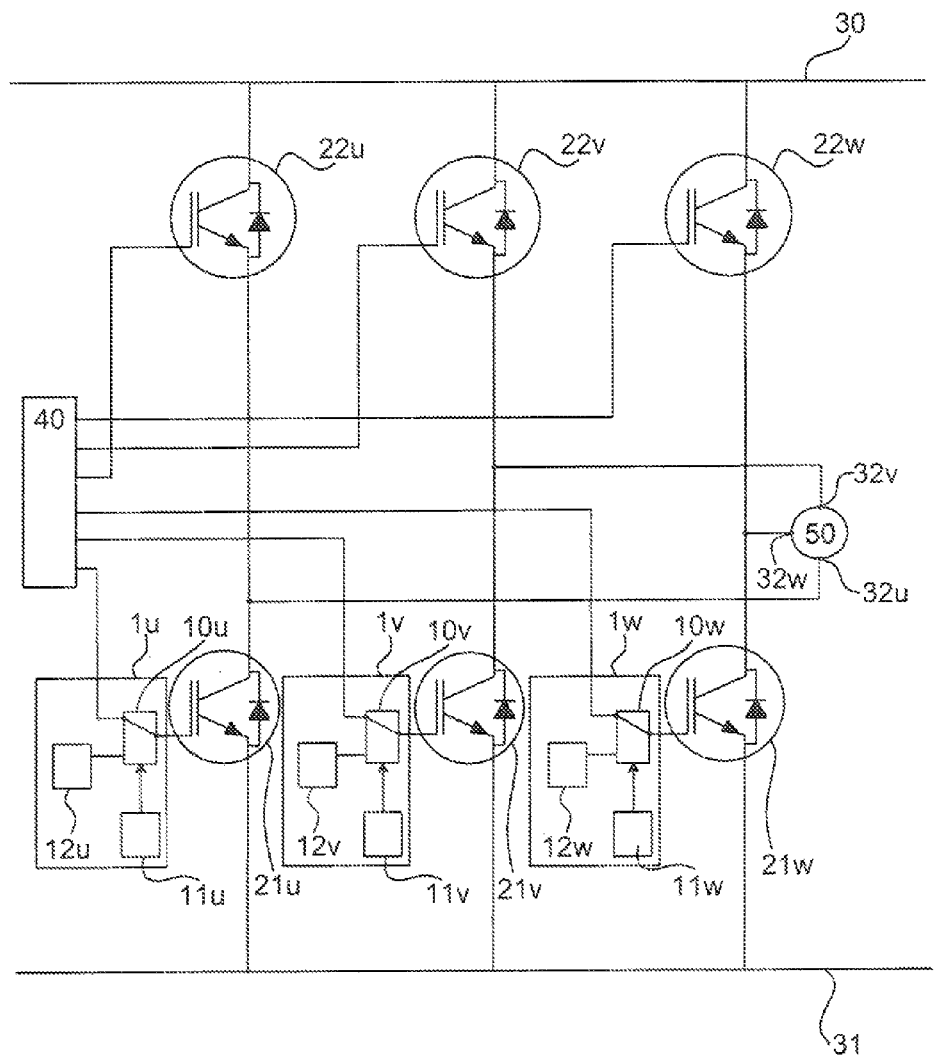
FIG. 1 is a schematic diagram of an environment where a protection circuit according to an embodiment of the present invention can be applied.

FIG. 1 is a schematic diagram of an environment where a protection circuit according to an embodiment of the present invention can be applied.

A three-phase permanent magnet synchronous motor 50 is powered through three AC (Alternating Current) inputs 32$u$, 32$v$, 32$w$. The motor can be used for any suitable purpose, where one example is to drive a vehicle. In such a context the vehicle could be provided with two or more systems as shown in FIG. 1 to drive two or more wheels of the vehicle, respectively. Another application can be a motor 50 that is mounted onto a diesel motor output shaft and used as a generator.

To allow control of frequency and power supplied to the motor 50, a bridge leg inverter system is used where the inputs 32$u$, 32$v$, 32$w$ are switched between a positive DC voltage 30 and a negative DC voltage 31. The difference in voltage between the positive and the negative DC voltages 30, 31 typically ranges between 300 and 900 volts. The positive and negative DC voltages can be symmetrical or asymmetrical about zero or one could be zero. The DC voltages 30 and 31 can in turn be created from a rectified AC source or from another DC source such as a battery or fuel cell. The switching is performed in main drive switches 21u and 22u for a u-phase, in main drive switches 21v and 22v for a v-phase and in main drive switches 21w and 22w for a w-phase. The main drive switches 21u, 21v, 21w, 22u, 22v, 22w can be insulated-gate bipolar transistors (IGBT) or any other suitable switch.

Each main drive switch 21u, 21v, 21w, 22u, 22v, 22w can have a corresponding gate drive circuit (not shown) between a controller and its gate. During normal operation of the motor 50, each gate drive circuit is controlled from an output (typically a digital output) of a controller 40 to effect pulse width modulation (PWM) as desired from the controller 40. The controller 40 can thus control the frequency and power supplied to/from the motor/generator 50.

In the drive system shown in FIG. 1, each phase has one protection circuit 1u, 1v, 1w, respectively. Each protection circuit 1u, 1v, 1w comprises a DC source 12u, 12v, 12w, a changeover switch 10u, 10v, 10w and a changeover control device 11u, 11v, 11w, respectively. As will be explained in more detail below, when an overvoltage is detected in the main DC source 30, 31, the changeover control device 11u, 11v, and/or 11w will control its respective changeover switch 10u, 10v, 10w to connect the gate of the respective main drive switch 21u, 21v, 21w to the respective DC source 12u, 12v, 12w.

Using the protection circuits 1u, 1v, 1w, three independent protection arrangements for dc overvoltage are provided. It is sufficient if one of these protection circuits 1u, 1v, 1w is working in order to save the drive system of all phases from catastrophic failure. This is because the other main switches contain rectifier diodes that will always conduct in one direction without active control. In other words, the protection circuits provide redundant protection to all drive systems. In this way, all drive systems connected to the same DC bus are protected. Consequently, even only two protection circuits still provide redundant overvoltage protection for all drive systems connected to the DC bus.

It is to be noted that although the protection circuits 1u, 1v, 1w are depicted connected to the lower switches 21u, 21v, 21w, the protection circuits 1u, 1v, 1w could equally well be connected to the upper switches 22u, 22v, 22w.

Figure 2:
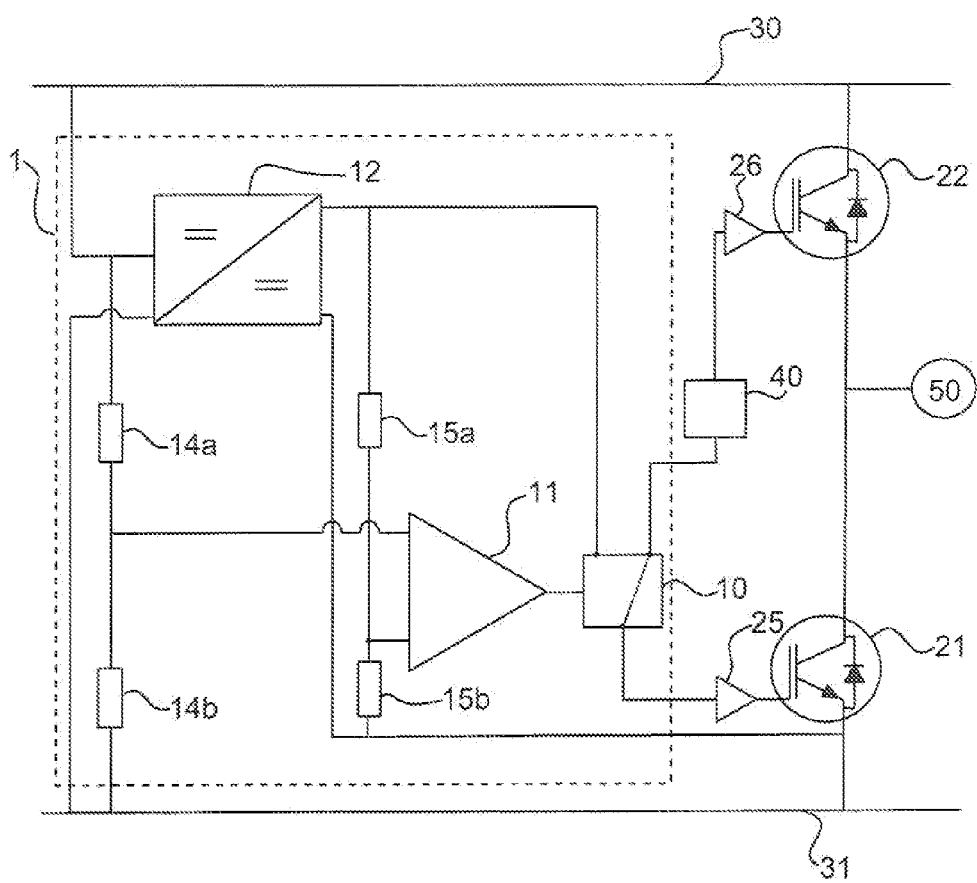
FIG. 2 illustrates one leg of the system of FIG. 1, including more details of its protection circuit.

FIG. 2 illustrates one leg of the system of FIG. 1, including more details of its protection circuit 1. The illustrated leg can be any of the three legs of FIG. 1 since all three legs have the same configuration in this regard.

There is an upper main drive switch 22 and a lower main drive switch 21, connected to a positive DC voltage 30 and a negative DC voltage 31, respectively. The lower main drive switch 21 is driven by a lower gate driver circuit 25 and the upper main drive switch 22 is driven by an upper gate driver circuit 26. As is known in the art per se, the controller 40 can thus, using pulse width modulation, control the main drive switches 21, 22 to provide an AC current of desired frequency and power to the motor 50.

A protection circuit DC source 12 is here in the form of a DC to DC converter. The DC to DC converter converts the main DC voltage 30, 31, used to drive the motor, to an output voltage suitable for controlling the main switch. In one embodiment, the DC to DC converter outputs a DC voltage which is less than one tenth of the main DC voltage 30, 31. The protection circuit DC source can be provided with an energy storage such as a battery or a capacitor. The energy storage allows the protection circuit 1 to operate even if the main DC source 30, 31 fails. The power requirements of the DC source are relatively low if it is only used to power the protection circuit 1. In one example, the continuous power output of the DC source is in the range of 0.2 to 5 Watts. The voltage of the output of the DC source can, for example, be between 10 and 20 Volts. One terminal of the output of the protection circuit DC source is connected to the negative main DC voltage 31. It is to be noted that the DC source can alternatively be implemented using a separate battery or low voltage DC circuit.

The changeover control device 11 is a comparator with two inputs. On one input the DC voltage of the main DC source 30, 31 is connected, which voltage is divided by resistors 14a, b. On the other input of the comparator a reference voltage is applied, for example the DC output voltage of the DC source 12, as divided by resistors 15a, b. The comparator thus compares the main DC voltage with a reference voltage provided from the DC source 12. The comparator 11 can be implemented using an operational amplifier or a dedicated voltage comparator semiconductor. Optionally, comparator comprises hysteresis to prevent jumping back and forth in the case that the inputs of the comparator are very similar in magnitude.

During normal operation of the drive system, the comparator controls the changeover switch 10 such that the gate of the lower main drive switch 21 is connected to, and thereby controlled by, the controller 40. The changeover switch 10 is any suitable analogue or digital switch with response times that are sufficiently fast. For example, a one microsecond response time will be sufficient in most cases.

In the case of an overvoltage of the main CC source 30, 31, the comparator 11 will be triggered to alter its state, and thereby control the changeover switch 10 such that the gate of the lower main drive switch 21 is connected to the upper output of the DC source 12. This saturates the lower main drive switch 21 which connects the terminal of the motor 50 to the negative main DC source 31. Before the lower switch 21 is turned on a signal is sent back to the controller 40 so that it will turn off the upper main switches 22.

In case the supply power for the controller 40 is lost, the gates of all main switches 21, 22 have already gone low.

Other faults can for example be due to a short circuit between the positive and negative DC voltages 30, 31. If that happens, the controller 40 can lose its power and is thus inoperable. If the short circuit is short lived and power returns to the main DC source 30, 31, due to generator operation of the motor, a large voltage can destroy components in times as short as 1 ms. This is too short of a time to allow the controller 40 to start up and become operational to control the main drive switches 21, 22.

Using the relatively simple components of the DC source 12, the comparator 11 and the changeover switch 10 connected according to the embodiments explained above, a protection circuit 1 is achieved which is fast enough to protect/components of the drive circuit from overvoltages in the case of a fault. Moreover, it is sufficient for only one protection circuit 1 to be operational to protect the entire drive circuit, resulting in redundant protection.

Another fault condition, when the motor is rotating at a high speed, could be that the controller 40 fails, which could lead to the motor being uncontrolled.

The permanent magnets will then generate an AC voltage that is rectified by the diodes in the main switches 21, 22 resulting in a mains DC-over-voltage 30, 31 which would be detected by the comparator in the embodiments described herein.

In the case of an electric vehicle with multiple motors, a fault condition as described above for one drive system would make the motor for one wheel inoperable. This could be detected by a central control system (not shown) which could disconnect the drive system for that wheel, e.g. using contactors. This allows the vehicle to remain operable, albeit with reduced power.

The invention has mainly been described above with reference to a few embodiments. However, as is readily appreciated by a person skilled in the art, other embodiments than the ones disclosed above are equally possible within the scope of the invention, as defined the appended patent claims.

The invention claimed is:

1. A protection circuit system for a drive circuit of a permanent magnet motor, comprising:
    a plurality of redundant protection circuits, wherein each protection circuit is powered by a main DC source that also powers the permanent magnet motor, the protection circuit comprises:
        a protection circuit DC source;
        a changeover switch being arranged to select an input to a gate of a main drive switch of the drive circuit, the input being selectable between an output of the protection circuit DC source and a second control signal; and
        a changeover control device connected to control the changeover switch, which changeover control device is arranged to ensure that the changeover switch selects the protection circuit DC source as the input to the gate of the main drive switch of the drive circuit, when an overvoltage of the main DC source is detected.

2. The protection circuit system according to claim 1, wherein for each protection circuit the changeover control device comprises a comparator.

3. The protection circuit system according to claim 2, wherein the comparator compares a voltage selected between two poles of the main DC source with a reference voltage.

4. The protection circuit system according to claim 3, wherein each one of two inputs of the comparator are connected to a respective voltage divider to allow comparison between the selected voltage between the two poles of the main DC source and the reference voltage.

5. The protection circuit system according to claim 2, wherein the comparator comprises hysteresis.

6. The protection circuit system according to claim 1, wherein for each protection circuit the protection circuit DC source comprises a DC to DC converter with a first side and a second side, wherein the first side is arranged to be connected to a main DC source for the drive circuit.

7. The protection circuit system according to claim 6, wherein, when in use, the output of the DC to DC converter has a voltage difference of less than one tenth of the voltage difference of the input of the DC to DC converter.

8. The protection circuit system according to claim 1, wherein for each protection circuit the protection circuit DC source comprises an energy storage.

9. A protection circuit system according to claim 1, wherein the number of redundant protection circuits corresponds to the number of phases of the permanent magnet motor.

10. The protection circuit system according to claim 1, consisting of three redundant protection circuits.

* * * * *